Feb. 7, 1961  R. N. ROWE  2,970,746
COOLING DEVICE FOR ALTERNATING CURRENT EQUIPMENT
Filed March 13, 1958  2 Sheets-Sheet 1
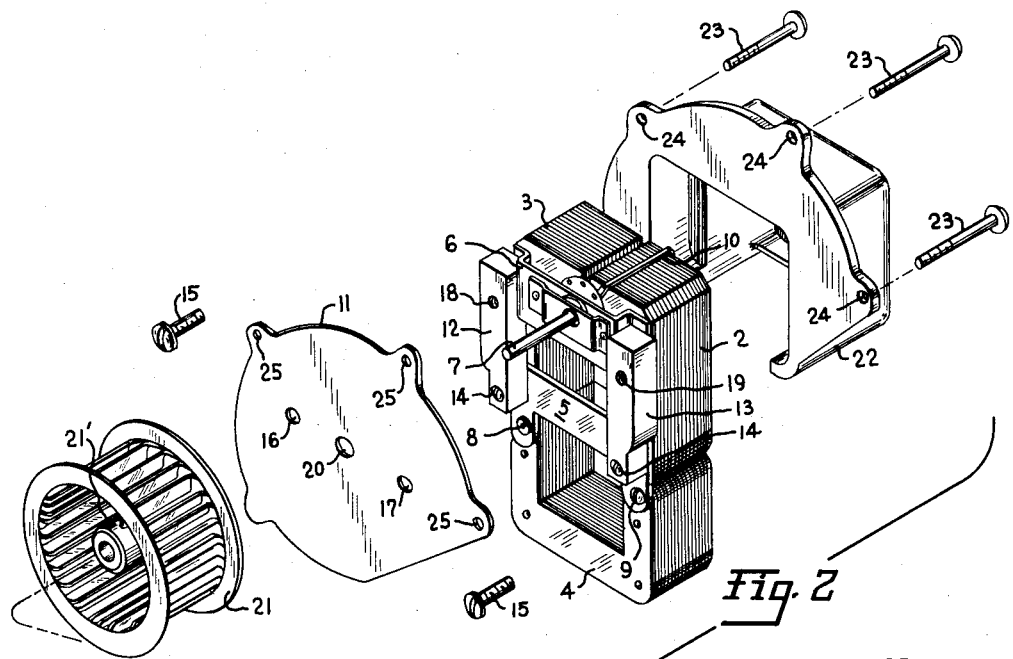
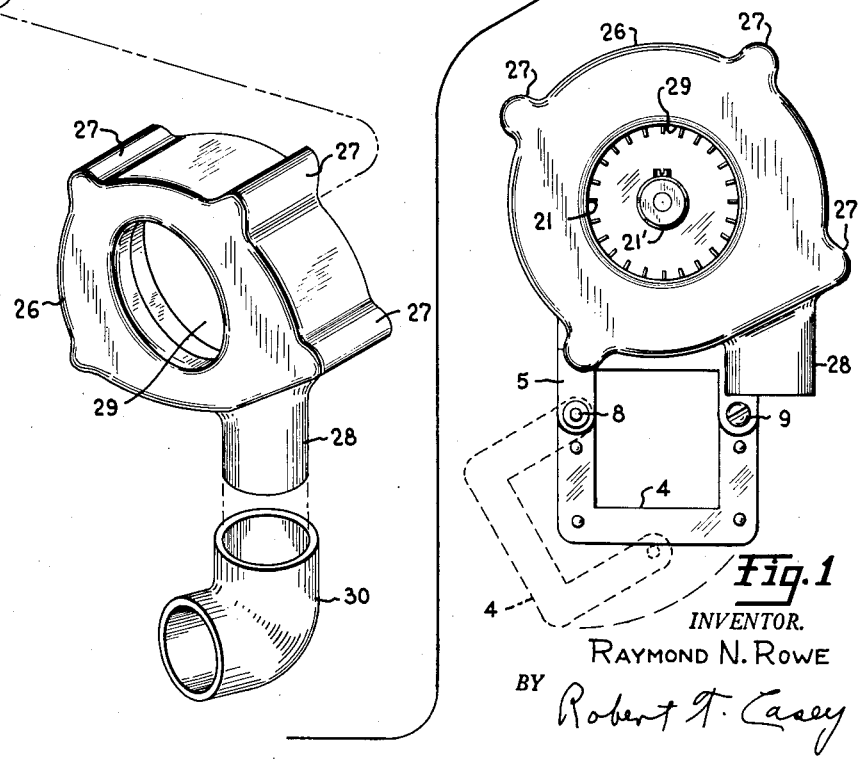
INVENTOR.
RAYMOND N. ROWE
BY Robert F. Casey
ATTORNEY INVENTOR.
RAYMOND N. ROWE
BY Robert A. Casey
ATTORNEY United States Patent Office 2,970,746
Patented Feb. 7, 1961

2,970,746
COOLING DEVICE FOR ALTERNATING CURRENT EQUIPMENT

Raymond N. Rowe, Plainville, Conn., assignor to General Electric Company, a corporation of New York Filed Mar. 13, 1958, Ser. No. 721,113

4 Claims. (Cl. 230—117)

My invention relates to alternating current motor devices and particularly to cooling devices for alternating current equipment adapted to operate only on the occurrence of predetermined electrical conditions in the equipment, and also to devices of this type which are adapted to be readily changed from one location to another.

In the past, electric motor driven cooling devices adapted for operation upon the occurrence of predetermined electrical conditions such as the occurrence of electric currents of predetermined magnitude, have required the use therewith of relay means of some type, thereby increasing the cost and complexity of the equipment as well as the likelihood of failure, and involving the operation of contacts with attendant possibility of sparking and therefore danger especially in hazardous locations such as explosive atmospheres.

In addition, electric motor driven cooling devices of the past have required the connection and disconnection of power terminals thereto in order to use them at a particular location, involving the element of danger to personnel and often requiring the shutting down of other power circuits to permit such connection safely. The necessity for making electrical connections to such devices is particularly burdensome in applications which are of a temporary nature, and more particularly in applications requiring the connection of low power motors in conjunction with high power apparatus. In the use of enclosed apparatus such as large electrical switches, switchboards, panelboards, etc., for instance, it is often desirable to insert a fan or blower for short periods of time and during unusually high current conditions in order to reduce temperature build-up. Even without ventilating the enclosure, the use of such a fan or blower reduces temperature build-up in such enclosed apparatus by substantially equalizing temperatures within the enclosure and reducing "hot spots" and also by moving air past the inner surfaces of the walls of the enclosure, thereby improving the rate of heat transfer through such walls to the outer air.

It is an object of the present invention to provide an electric motor driven cooling device of the alternating current type which will operate during and only during unusually high current conditions in an electrical circuit, without the use of relays.

It is another object of the present invention to provide an electric motor driven cooling device of the alternating current type which may be used in connection with high current carrying conductors without the necessity of making electrical connection thereto.

In accordance with the invention, there is provided a fan operated by an alternating current motor device comprising a magnetic core or field piece and a rotor driven by the magnetic field therethrough, the field piece being separable so as to be able to be clamped around a high current carrying conductor to energize said core by the field associated therewith without physical or electrical connection thereto.

The aspects of the invention which are considered to be novel will be pointed out in the appended claims. The invention in one particular embodiment, however, will be clearly understood by reference to the following detailed description, taken in conjunction with the accompanying drawings, in which:

Figure 1 is a front elevation view of an electrical blower device incorporating my invention;

Figure 2 is an exploded perspective view of the device of Figure 1; and

Figure 3:
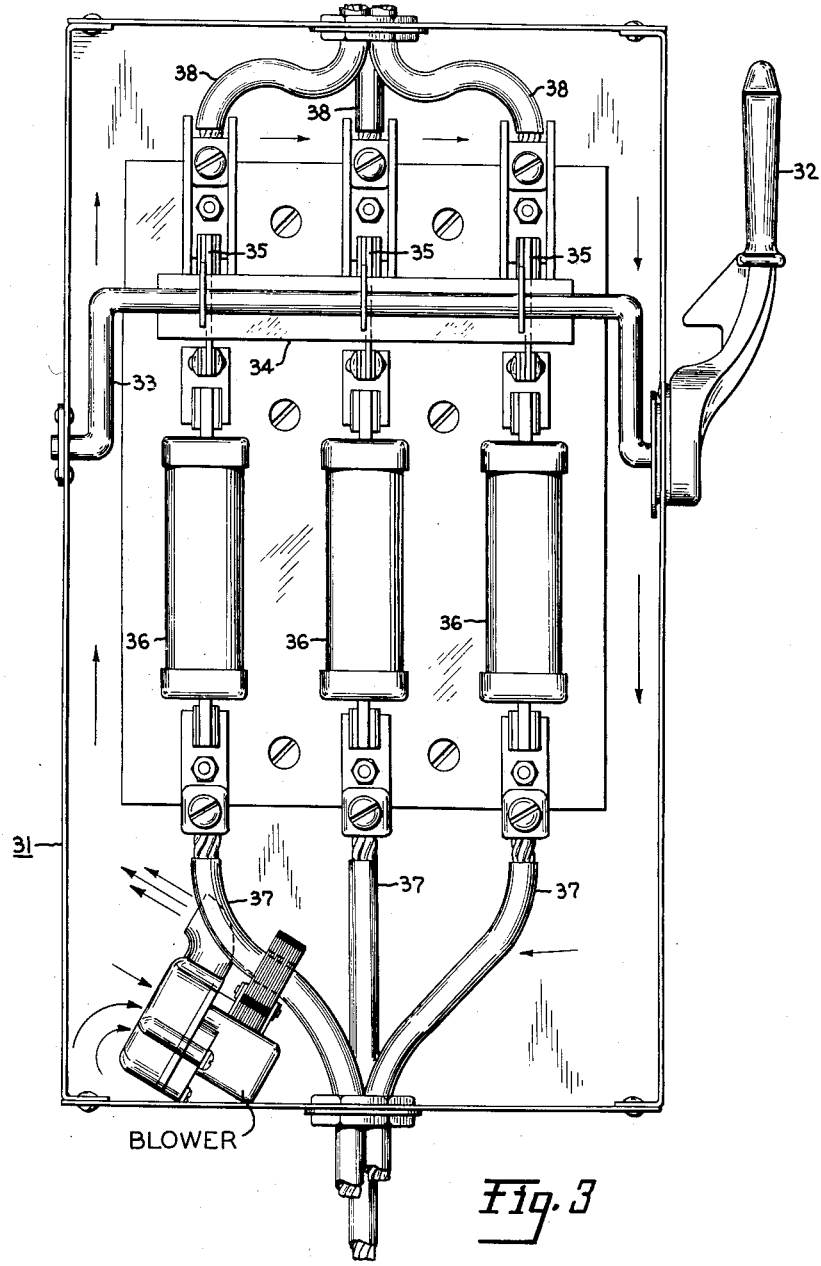
Figure 3 is a front elevation view of an enclosed electrical device, illustrating one application of the blower device of Figure 1, the cover of the enclosed device being omitted.

Referring particularly to Figures 1 and 2, the invention is shown as incorporated in an electrical blower device including a laminated stator comprising pole pieces 2 and 3, and a movable section 4 hinged to one of the pole pieces 3 by pin 8 and releasably attached to the pole piece 2 by means of bolt 9. The pole pieces 2 and 3 are mounted in spaced parallel relation by four brackets including two generally C-shaped lower brackets 5 (only one shown), and two generally channel shaped upper brackets 6 (only one shown). The brackets 5 and 6 are arranged on opposite sides of the pole pieces 2 and 3 to hold the pole pieces rigidly in spaced-apart relation. The brackets 6 also serve as bearing supports for the armature 7, whereby the rotor is disposed in the air gap formed between the pole pieces 2 and 3. The rotor or armature 7 is of the induction motor type, that is, it includes a generally cylindrical magnetic support and a number of short-circuited turns or windings of highly conductive material in which current is induced by the action of the magnetic field, and the reaction of the magnetic field of such induced currents with that of the core causing the rotation of the armature.

This type of motor provides a direct relation between speed and intensity of current, and therefore provides more cooling as needed, i.e., when the current is high.

When such a speed-to-current relation is not desired, a synchronous type motor may be used, the speed thereof being constant for a given constant frequency of the current in the energizing conductor.

A shading coil 10 is provided on one of the poles 2 to enable the rotor to develop starting torque.

A pair of spacer blocks 12 and 13 are mounted on the pole members 2 and 3 by suitable means such as by screws 14.

A base plate 11 is mounted on the spacing members 12 and 13 by screws 15 which pass respectively through the holes 16 and 17 in the plate and engage the tapped openings 18 and 19. A hole 20 is provided to accommodate the shaft of the rotor 7.

An impeller 21 is secured to the shaft by appropriate fastening means such as by a set screw, not shown, threaded in the portion 21' of the impeller 21 and bearing on the shaft of rotor 7. A rear cover member 22 is secured to the stator by bolts 23 which pass through the holes 24 in the housing and holes 25 in the plate and thereafter engage tapped openings in projections 27 in front blower cover 26. A tubular outlet extension 28 is provided on the housing 26 as an outlet passage for air, which is drawn in through the opening 29 when the impeller 21 is rotated. A rotatable extension 30 is provided, attached to outlet 28 for directing the outlet of air as desired.

In Figure 3, the invention is illustrated as installed in an enclosed electrical device comprising a large size fused switch, comprising an enclosure 31 having a manually operable handle 32 pivotally supported in one side wall to operate a yoke 33, connected by insulating means 34 to switch blades 35. Each pole of the switch has a fuse 36 connected electrically in series therewith, such as by electrical conductors 37 and 38.

The blower device is installed by merely removing the bolt 9, swinging the section 4 open about the pivot 5, and clamping it about the one of the conductors 37 and reinserting the bolt 9. Thus the installation is made without interrupting the conductor 37, without the necessity of contact with live parts, and without the necessity of opening the switch.

When the current in the conductor 37 reaches a predetermined magnitude, the magnetic field associated with the conductor 37, passing between the pole portions 2 and 3, activates the rotor 7 and the impeller 21, causing the blower to circulate air within the enclosure 31 or through it, if ventilated.

It will be observed that the motor will operate only when the current in the conductor exceeds a predetermined amount. In addition, with a single phase, shaded-pole induction motor according to the present invention, the speed of rotation of the motor, and hence the amount of cooling is in direct proportion to the intensity of the conductor current, and hence the cooling need.

The motor may be moved about from one location to another without the necessity for electrical connection or disconnection to any electrical conductor. This is because it is adapted to operate from the alternating current magnetic field of a conductor without the necessity for physical contact with such conductor.

While I have disclosed but one specific embodiment of my invention, it will be apparent that many modifications thereof may be made without departing from the spirit of the invention, and I therefore intend by the appended claims to cover all such modifications as fall within the true spirit and scope of the invention.

What I claim as new and desire to secure by Letters Patent of the United States is:

1. A device for cooling electrical apparatus comprising: a laminated stator forming a simple magnetic loop about a central window and having an air gap therein, a portion of said stator remote from said air gap being hinged to open said magnetic circuit for the introduction of an alternating current carrying conductor into said window; an induction rotor mounted in said air gap for rotation therein; and an air impeller fixed adjacent said stator and connected to be operated by said induction rotor, whereby alternating currents in said conductor in excess of a predetermined amount operate said impeller to produce a flow of air for cooling purposes.

2. A device for cooling electrical apparatus comprising: a laminated stator forming a simple magnetic loop about a central window and having an air gap therein, a portion of said stator remote from said air gap being hinged to open said magnetic circuit for the introduction of an alternating current conductor into said window; supporting means adjacent said air gap to maintain the relative positions of the parts of said stator adjacent said air gap when said hinged portion is opened; an induction rotor mounted in said air gap for rotation therein; and an air impeller fixed adjacent said stator and connected to be operated by said induction rotor, whereby alternating currents in said conductor in excess of a predetermined amount operate said impeller to produce a flow of air for cooling purposes.

3. A device for cooling electrical apparatus comprising, in combination with an alternating current conductor: a laminated stator forming a simple magnetic loop about a central window and having an air gap therein, a portion of said stator remote from said air gap being hinged to open said magnetic circuit for the introduction of said alternating current conductor into said window; an induction rotor mounted in said air gap for rotation therein; and an air impeller fixed adjacent said stator and connected to be operated by said induction rotor, whereby alternating currents in said conductor in excess of a predetermined amount operate said impeller to produce a flow of air for cooling purposes.

4. A device for cooling electrical apparatus comprising, in combination with an alternating current conductor: a laminated stator forming a simple magnetic loop about a central window and having an air gap therein, a portion of said stator remote from said air gap being hinged to open said magnetic circuit for the introduction of said alternating current carrying conductor into said window; supporting means adjacent said air gap to maintain the relative positions of the parts of said stator adjacent said air gap when said hinged portion is opened; an induction rotor mounted in said air gap for rotation therein; and an air impeller fixed adjacent said stator and connected to be operated by said induction rotor, whereby alternating currents in said conductor in excess of a predetermined amount operate said impeller to produce a flow of air for cooling purposes.

References Cited in the file of this patent

UNITED STATES PATENTS

| 533,249 | Steinmetz | Jan. 29, 1895 |
| 1,341,405 | Woodard | May 25, 1920 |
| 1,977,185 | Haydon | Oct. 16, 1934 |
| 2,023,860 | Stanton | Dec. 10, 1935 |
| 2,291,013 | Wheeler | July 28, 1942 |
| 2,386,508 | Ripley | Oct. 9, 1945 |
| 2,519,071 | Rowell | Aug. 15, 1950 |
| 2,783,437 | Yenni et al. | Feb. 26, 1957 |
| 2,786,953 | Schaefer | Mar. 26, 1957 |

FOREIGN PATENTS

| 713,761 | Germany | Sept. 14, 1938 |